April 27, 1965     J. DURST     3,180,218
OBJECTIVE LENS WITH MOUNTING ARRANGEMENT
FOR PHOTO-TRANSDUCER
Filed Feb. 12, 1962
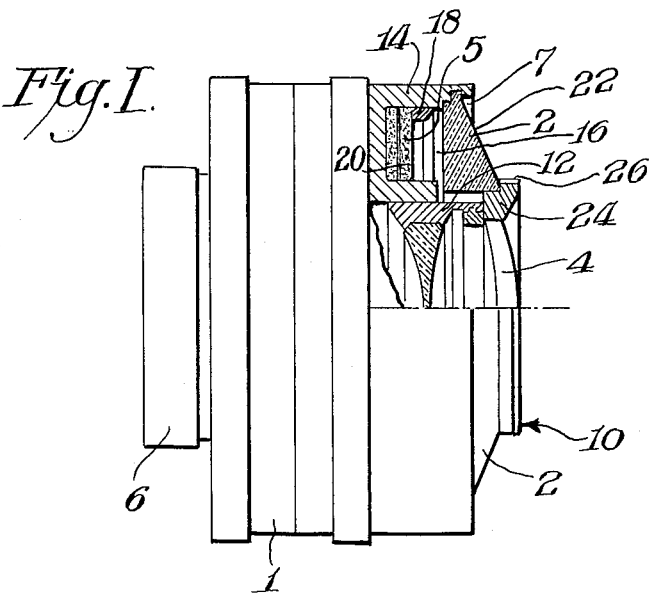
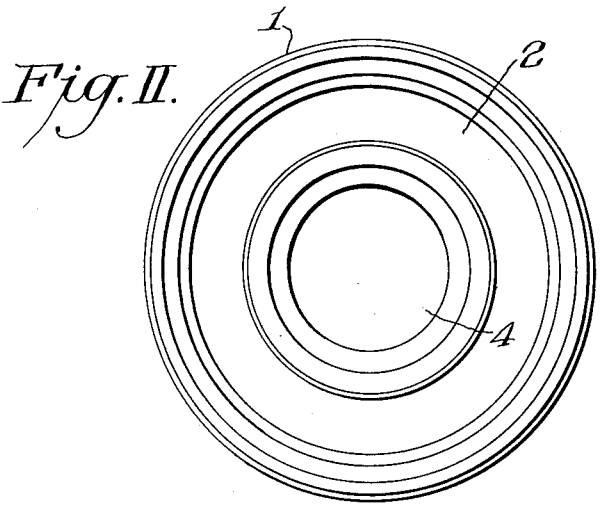
INVENTOR
Julius Durst
BY Connolly and Hutz
ATTORNEYS

United States Patent Office 3,180,218
Patented Apr. 27, 1965

3,180,218
OBJECTIVE LENS WITH MOUNTING ARRANGEMENT FOR PHOTO-TRANSDUCER
Julius Durst, Brixen, near Bozen, Italy, assignor to Durst A.G. Fabrik Fototechnischer Apparate, Bolzano-Bozen, Italy
Filed Feb. 12, 1962, Ser. No. 172,645
Claims priority, application Italy, Mar. 6, 1961, 3,963/61
1 Claim. (Cl. 88—57)

This invention relates to a mounting and light concentrating arrangement for a photo-transducing element in a camera, and it more particularly relates to such an arrangement which illuminates the photo-transducing element under conditions similar to that of the objective lens.

Transparent protective plates, some of which incorporate lenticular screens, are mounted in front of photo-transducing elements on photographic cameras for protecting them from the atmosphere and for collecting and concentrating light upon them under similar conditions to that of the main objective lens. Lenticular screens used for this purpose project a number of small images upon the photoelectric cell, which are a function of the image projected by the objective lens. Such lenticular screens are also sometimes arranged upon the camera casing arcuately about the optical axis of the objective lens.

However, such lenticular screens tend to collect dust in the depressions between their lens elements, which alters their transparency and refractive power. Furthermore, such screens can be made economically only of synthetic plastic materials whose optical properties are not all that might be desired.

An object of this invention is to provide a simple, economical and efficient mounting and light concentrating arrangement for a photo-transducing element on a photographic camera.

In accordance with this invention an annular photo cell is mounted concentrically about the objective lens within an annular space between the lens tube and a cylinder mounted about it. An annular lens, having a convex outer surface with the same optical axis as the objective lens, is mounted in the front of this space to seal it and to concentrate light upon the photocell under conditions similar to that to which the objective lens is exposed. This similarity of illumination is accurately facilitated by shaping the convex surface of the annular lens with a form similar to that of the frontal element of the objective lens. The aforementioned outer cylinder can be incorporated upon a lens attachment, and the annular lens therefore maintains a position corresponding to that of the objective lens as it is moved to focus it. This attachment can also incorporate a shutter.

Novel features and advantages of the present invention will become apparent to one skilled in the art from a reading of the following description in conjunction with accompanying drawings wherein similar reference characters refer to similar parts and in which:

FIG. 1 is a side view in elevation partially cut away in cross-section of a lens attachment incorporating one embodiment of this invention; and FIG. 2 is a front view in elevation of the lens attachment shown in FIG. 1.

In FIGS. 1 and 2 is shown a combined lens and shutter attachment 1 including an objective lens 10 having a frontal element 4 mounted within a lens tube 12. Attachment 1 also incorporates an outer cylinder 14 concentrically mounted about lens tube 12 to provide an annular space 16 between them. An annular photo-transducing element 5 is mounted within annular space 16, and it is secured in position by a threaded retaining ring 18. An annular filter 20 is also secured within retaining ring 18 for adjusting the sensitivity of photocell 5. Annular lens 2 having a convex frontal surface 22 is mounted in an annular shoulder within cylinder 14 and disposed at the front of annular space 16 between outer cylinder 14 and ring 24 which forms the outer end of lens tube 12, which also supports frontal objective element 4. A threaded retaining ring 7 and rim 26 of objective lens tube outer ring 24 secure lens 2 in place respectively between cylinder 14 and outer lens ring 24 thereby sealing annular space 16.

Annular or ring-shaped lens 2 has an outer surface of an optical form similar to that of the outer surface of frontal element 4 for concentrating light rays upon photocell 5, in a manner similar to that accomplished by objective lens 10 in entirety. Lens 2 accordingly has the same optical axis as that of objective lens 10, and its radius of curvature has a center which is disposed approximately upon the optical axis of objective lens 10. Furthermore, lens 2 is moved in and out together with objective lens 10 when the portion of attachment 1 to which they are attached is adjusted to focus the lens when attachment 1 is connected to a camera by threaded coupling 6.

What is claimed is:

A combined lens and photo-transducer attachment for a camera comprising a housing, connecting means upon the rear of said attachment for mounting it upon said camera, said housing including an outer cylinder concentrically disposed about the optical axis of said camera, a lens tube within said housing concentrically disposed about said optical axis and spaced within said outer cylinder to form an annular space therebetween, an annular photo-transducer mounted within said annular space, an annular filter within said annular space in front of said photocell, a filter retaining ring engaging within said outer cylinder and securing said filter closely adjacent said photocell, a compound objective lens having a number of components including a frontal component mounted within said lens tube, an objective lens retaining ring engaging said lens tube and securing said frontal component to said lens tube, said frontal component having a convex frontal surface, an annular shoulder within said outer cylinder adjacent said annular recess, an annular lens having a frontal convex surface mounted in front of said annular shoulder, and outer retaining ring engaging within said outer cylinder and securing the outer periphery of said annular lens adjacent said annular shoulder, a rim on said objective lens retaining ring engaging the inner periphery of said annular lens and cooperating with said outer retaining ring in securing said annular lens in front of said annular space and sealing it, and said annular lens having approximately the same optical axis and approximately the same frontal convex surface as said frontal component of said objective lens for collecting and directing light upon said photo-transducer similar to that collected and directed by said objective lens whereby said photo-transducer is exposed to light conditions similar to those being transmitted to said camera by said objective lens.

References Cited by the Examiner
UNITED STATES PATENTS
1,979,159  10/34  Howser.
1,993,084  3/35   Brewer _____ 88—23
2,612,091  9/52   Weiss _____ 95—10

JEWELL H. PEDERSEN, *Primary Examiner.*